Patented June 15, 1954

2,681,321

UNITED STATES PATENT OFFICE 2,681,321

PRODUCTION OF POROUS MATERIALS FROM FILM-FORMING ORGANIC THERMOPLASTIC MASSES

Fritz Stastny, Weinheim (Bergstrasse), and Rudolf Gaeth, Ludwigshafen (Rhine), Germany, assignors to Badische Anilin- & Soda-Fabrik Aktiengesellschaft, Ludwigshafen am Rhine, Germany No Drawing. Application February 24, 1951, Serial No. 212,676

Claims priority, application Germany February 27, 1950

12 Claims. (Cl. 260—2.5)

This invention relates to an improved process of producing porous materials from film-forming organic thermoplastic masses.

For the production of porous masses from film-forming organic thermoplastic masses the procedure has hitherto been to mix the thermoplastic masses in pulverulent form in ball mills with so-called "raising agents," i. e. substances which decompose when heated to give a strong evolution of gas, and to press the mixture in gas-tight moulds in presses at about the softening temperature of the synthetic substances concerned. The whole is then cooled and there is first obtained a solid body which is then heated again to the softening point either without the employment of a mould or, when it is desired to obtain a shaped article, in a corresponding open or closed mould, whereby the gas under pressure contained in the mass distends the same. After cooling there is obtained either a highly porous mass without any particular shape or a highly porous shaped article.

This procedure is relatively troublesome and furthermore is not applicable to all synthetic substances. Many of them cannot be brought into a pulverulent form or can only be brought into such a form with difficulty. Furthermore only shaped articles or unshaped masses of small dimensions can be produced because during the preparation of the initial pressed articles or masses extremely high pressures must be employed by reason of the high pressures set up by the decomposition of the raising agent.

It has also been proposed to prepare highly porous masses by dissolving thermoplastic masses in solvents of low boiling point, heating the solution in a pressure vessel to a temperature considerably above the boiling point of the solvent and then rapidly releasing the pressure. This method has not acquired any great practical importance because the solvent vapour contained in the pores only escapes with extreme difficulty and detrimentally affects the properties of the porous masses or shaped articles thus obtained.

We have now found that highly porous masses or shaped articles having very uniform pore distribution can be obtained in a simple manner from organic thermoplastic masses by introducing into the masses a liquid which does not dissolve the same or only causes the same to swell, said liquid having a boiling point lying lower than the softening point of the mass employed, and then heating the mass to a temperature above the boiling point of the liquid. When the synthetic substance can be readily brought into pulverulent or finely grained form, the said liquids can be homogeneously mixed therewith without difficulty. The mixtures can be handled easily. They may be heated in open moulds until the mass is uniformly softened and the liquid has been converted into the vapour form. The mass is distended by the vapour pressure and uniform pores are formed the size of which is dependent on the temperature employed, on the speed of heating, on the nature of the liquid and on the nature of the synthetic substance.

When employing polymerisates, it has been found to be specially advantageous technically to polymerize the monomers in the presence of the necessary amounts of the liquids which do not dissolve or which only swell the polymerisate, the polymerization being carried out at a temperature below the boiling point of the liquids. In this way there is directly obtained a completely homogeneous mixture of the polymerisate and the liquid. In special cases the polymerization may be carried out under pressure at moderately elevated temperatures. The mixture of polymerisate and liquid may then be worked up, in the manner above described, to give porous masses or shaped articles having specially uniform pore size. In carrying out the polymerization, polymerisates or other highly polymeric substances of other kinds may be dissolved in the monomers.

When preparing porous shaped articles it is preferable to employ temperatures which are only a few degrees above the Martens number of the synthetic substance in question, i. e. temperatures at which the mass is softened to such an extent that pore formation by evaporation of the liquid is possible but that such a marked softening does not occur that the resulting highly porous article can undergo a marked reduction in volume upon cooling to room temperature. The process may be carried out in moulds or without the use of moulds. When working in closed moulds, porous shaped articles can be prepared the pores of which are formed somewhat similarly to honeycomb and are directed vertically upwards, if the mass of synthetic substance and liquid uniformly dispersed therein which is introduced into the mould is adjusted in its dimensions accurately to the ground-plan of the mould so that no extension is possible in a lateral direction. Such articles have a specially high resistance to compression in a vertical direction. By employing sufficiently large amounts of the non-dissolving or swelling liquids, masses and shaped articles may be produced which have specially large pores such as it was impossible to obtain with the raising agents hitherto usually employed, such as ammonium bicarbonate and diazo compounds. Consequently, considerably lighter porous masses and shaped articles can be prepared than by the methods hitherto usual. Masses or shaped articles having a specific gravity of 0.2 to 0.005 or even less may be prepared depending on the conditions employed. The known additional substances, such as softeners, fillers and dyestuffs, may also be used.

Suitable organic thermoplastic masses are for example thermoplastic polyvinyl compounds, such as polystyrene, polyacrylic compounds, polymethacrylic compounds, polyvinyl ethers, polyvinyl esters of organic acids, polyvinyl chloride, polyvinylidene chloride, polyisobutylene and polyvinyl carbazole, and also interpolymers of two or more of the monomers from which the said polymers are derived. Suitable liquids for the formation of the pores are for example pentane, hexane, heptane, petroleum ether, spirocyclane, cyclopentane, cyclopentadiene, acetone, methyl alcohol, methyl acetate, ethyl acetate, methyl formate, ethyl formate, dichlorethylene, isopropyl chloride, propionaldehyde and dipropyl ether.

We have further found that especially finely-pored masses are obtained by the above process when the frothing up of the mass into a porous mass is carried out in water, in another liquid which does not dissolve the thermoplastic mass or in a moist atmosphere. For example the frothing may be carried out in water at about 95° C. or also under a slight excess pressure in a pressure vessel, for example, at 1.2 atmospheres. The frothing up may, however, also be carried out in a pressure vessel filled with steam under an excess pressure of 0.1 to 10 atmospheres. The development of the pores can be influenced to a great extent by varying the temperature or the pressure employed. Contrary to expectation a shaped article having very fine pores is obtained in particular by frothing up directly in water without external excess pressure or at a pressure of 0.1 to 4 atmospheres. The pores are so small that they can scarcely be detected with the naked eye.

The masses have excellent mechanical properties, are elastic and soft and have a specific gravity of about 0.1 to 0.01 or less. They may be used for many purposes for which prior porous masses of relatively hard synthetic materials, as for example from polystyrene, could not be employed. Thus these finely-pored structures may be used as cork substitute, for example for packings, bottle corks, crown cork discs, packing plates, bottle stoppers, parts of swimming belts and for the production of lifebelts, boats and parts of boats, and in all cases where requirements are placed on the porous material as regards softness and elasticity. The stability to acid of the porous articles of the said synthetic materoals, as for example finely-pored polystyrene, is of special importance for example when used as stoppers for bottles containing acid. By reason of the microporous structure which can be produced in the frothed up synthetic materials by maintaining definite conditions, the use of the products as diaphragms is also possible, and this is of special interest when stability to acid of the diaphragms is required. A material well suited for this purpose is obtained for example from finely-pored distended polystyrene.

The following examples will further illustrate the invention but the invention is not restricted to these examples. The parts are by weight.

Example 1

400 parts of polystyrene are dissolved in 600 parts of monostyrene and to the solution, while stirring well, there are added 60 parts of petroleum ether having the boiling range of 42° to 60° C. and 8 parts of benzoyl peroxide. The resulting mass is stored at 32° C. and, after 28 days, yields a homogeneous, glass-clear solid body which is then heated at 85° C. in a closed mould for 6 hours. A porous shaped article is obtained which has a specific gravity of 0.05.

Example 2

600 parts of polyisobutylene are kneaded in a kneader to a homogeneous mass with 800 parts of polystyrene and 800 parts of monostyrene with an addition of 220 parts of hexane and 15 parts of benzoyl peroxide, and the mass, after removal from the kneader, is stored for 30 days in a closed mould at 30° C. In this way a tough solid body is obtained which is converted by storage for 6 hours at 90° C. into a porous mass having a specific gravity of 0.09.

Example 3

450 parts of polymethacrylic acid methyl ester are dissolved in 550 parts of monomeric methacrylic acid methyl ester and, while the whole is being thoroughly mixed, 120 parts of cyclopentane and 6 parts of benzoyl peroxide are added to the solution. The homogeneous mixture is stored for 30 days at 35° C. A solid body is obtained which can be converted by heating at 92° C. into a porous mass or a porous shaped article having a specific gravity of 0.1.

Example 4

A plate of polystyrene, 3 millimeters in thickness, is allowed to lie for 28 days at 25° C. in petroleum ether having the boiling range of 40° to 62° C. The homogeneously swollen mass is then heated at 90° for 3 hours while lying free. A coarse-pored cellular body is obtained which has a specific gravity of 0.02.

Example 5

Heptane is poured over polystyrene in finely-grained form and allowed to remain for 30 days at 30° C. A compact, coherent mass is formed which, after pouring off the excess heptane, may be converted by storage for 4 hours at 100° C. into a porous body having a specific gravity of 0.09.

Example 6

A sheet of polystyrene, 0.3 millimeter in thickness, is placed for 25 minutes in petroleum ether having a boiling point range of 40° to 62° C. and then heated at 90° C. for 30 minutes. After cooling a porous sheet is obtained having a specific gravity of 0.048. The sheet may be cut into bands which may be used for covering electrical conductors.

Example 7

400 parts of polystyrene are dissolved in 600 parts of monostyrene and to the solution there are added while stirring well 60 parts of petroleum ether having a boiling range of 45° to 50° C. and 8 parts of benzoyl peroxide. The mass obtained is stored for 30 days at 33° C., a homogeneous, glass-clear solid body being obtained.

This is then treated for 4 hours in a vessel containing steam at 105° C. A finely-pored shaped article having a specific gravity of 0.06 is obtained.

Example 8

300 parts of polystyrene are dissolved in 700 parts of monostyrene and to the solution there are added while stirring well 65 parts of petroleum ether having a boiling range of 47° to 50° C. and 8 parts of benzoyl peroxide. The liquid mass is charged into a cylindrical vessel and stored closed for 30 days at 30° C., a homogeneous solid body being thus formed. This solid body is provided with an axial boring 6 millimeters in diameter and then stored for 3 hours in water at 100° C. and 0.1 atmosphere excess pressure. A finely-pored cylindrical distended body is formed which has a specific gravity of 0.04. Foils of 0.4 millimeter thickness are cut from this body with a moving knife, as for example a circular band saw, and these may be used as such, or after being cut into smaller bands, for insulating wires in the cable industry or as an insulating material for a variety of technical purposes.

Example 9

350 parts of polystyrene are dissolved in 650 parts of monostyrene and to this solution 60 parts of petroleum ether of an upper boiling range of 50° to 55° C. and 8 parts of benzoyl peroxide are added while stirring vigorously. The liquid mass obtained is stored in a closed mould at 32° C. for 20 days, a homogeneous solid being obtained. The solid is placed in a cylindrical mould 10 centimeters in diameter and 1 meter in length, sieve-closed at one end, and then stored in water of 95° C. for 3 hours. The solid undergoes expansion but only so in its longitudinal direction, so that a fine-pored cylindrical body having spongy consistency is obtained. It has a specific gravity of 0.06. It is cut into foils by a mechanically moved knife which, after being reduced to bands of smaller width, can be used as an insulating material for cables.

The mould used for the solid to undergo expansion, instead of being cylinder-shaped, may also be of a closed quadrangular type with sieve-plates constituting its lateral boundary walls. In this case, too, a fine-pored body having a specific gravity of 0.06 is obtained.

The expansion may quite generally be done in closed moulds of any type in which the walls are sieve-closed at one or several places after the fashion specified above. Depending on the particular type of mould used spongy bodies having a specific gravity of 0.04 to 0.09 are obtained, as also, for example, such articles as dolls, fish and similar toys, curved plates and the like.

Example 10

300 parts of polystyrene are dissolved in 700 parts of monostyrene and to this solution 60 parts of petroleum ether having a boiling point range of from 60° to 65° C. and 20 grams of benzoyl peroxide are added. The solution gives a homogeneous transparent solid after standing at 30° C. for 30 days, the solid being thereafter made into a porous body (spec. gravity 0.05) by 20 minutes' storage in water of a temperature of 95° C. The porous body has a micro-porous structure and an exceptionally high resistance to pressure and bending. Moreover, it is remarkably soft and elastic. By reason of these latter properties which are retained also after compression whereby the volume is diminished, the material may quite generally be used as a substitute of cork. The compression of the material may be done in a direct way by compacting in presses or by any other appropriate method; the material so treated will withstand mechanical strain even better than the non-compacted porous material. Both the non-compacted and the compacted material are applicable for miscellaneous purposes in practical use, as for example as padding material in upholstery, as life-belts, as washers, boat parts, soles, instep-raisers, shoe-uppers, floats in controlling instruments, shock-absorbers for motor-cars and as a shock-absorbing means for other purposes, as for example as a vibration-damping support for motors, as a stuffing material for air-plane wings and, quite generally, as a constructional material in air-craft making, as for example for the inner outfit of air-craft cabins, furthermore as sun helmets, as a flooring and walling material, as hat-bands, as packing material, as an insulation material against heat, cold and sound, as an interstitial layer between wooden and metal plates, as pin-cushions, as sealing material for miscellaneous uses, for example as bands, disks, rings, also as a material for making floating and fancy animals and, quite generally, toys of any kind.

The term "softening point" as used herein refers to the Martens number as described by R. Houwink, "Fundamentals of Synthetic Polymer Technology in its Chemical and Physical Aspects," 1949 edition, page 73.

What we claim is:

1. A process for the production of porous polystyrene which comprises homogeneously dispersing in monostyrene an organic volatile non-reactive liquid in which polystyrene is insoluble, polymerizing this mixture at temperatures below the boiling point of the liquid under the conditions employed, and heating the resulting mass to a temperature above the boiling point of the liquid and above the softening point but not more than about a few degrees above the softening point of the resulting polystyrene, the relative proportions of monostyrene and said liquid employed being such that the polymerization product is a solid body containing the liquid dispersed throughout.

2. A process for the production of porous polystyrene which comprises homogeneously dispersing an organic volatile non-reactive liquid in which polystyrene is insoluble in a solution of monostyrene containing polystyrene dissolved therein, polymerizing this mixture at temperatures below the boiling point of the liquid under the conditions employed, and heating the resulting mass to a temperature above the boiling point of the liquid and above the softening point but not more than about a few degrees above the softening point of the resulting polystyrene, the relative proportions of monostyrene, polystyrene and said liquid employed being such that the polymerization product is a solid body containing the liquid dispersed throughout.

3. A process for the production of porous polystyrene which comprises adding to monostyrene a non-reactive liquid volatile hydrocarbon in which polystyrene is insoluble, polymerizing this mixture at temperatures below the boiling point of the employed liquid hydrocarbon under the conditions employed, and heating the resulting mass to a temperature above the boiling point of hydrocarbon and above the softening point but not more than about a few degrees above the softening point of the resulting polystyrene, the relative proportions of monostyrene and said hydrocarbon employed being such that the polymerization product is a solid body containing the hydrocarbon dispersed throughout.

4. A process for the production of porous polystyrene which comprises adding to monostyrene petrol ether having the boiling range of 42 to 60° C., carrying out the polymerization at temperatures below the boiling range of the employed petrol ether under the conditions employed, and heating the resulting mass to a temperature above the boiling range of the petrol ether and above the softening point but not more than about a few degrees above the softening point of the resulting polystyrene, the relative proportions of monostyrene and petrol ether employed being such that the polymerization product is a solid body containing the petrol ether dispersed throughout.

5. A process as claimed in claim 3 wherein the volatile liquid hydrocarbon is one selected from the class consisting of pentane, hexane, heptane, cyclopentane, cyclopentadiene and petrol ether having a boiling range of 42° C. to 60° C.

6. A process for the production of porous polystyrene which comprises homogeneously dispersing in monostyrene a non-reactive volatile organic liquid in which polystyrene is insoluble, polymerizing this mixture at temperatures below the boiling point of the liquid under the conditions employed, and heating the resulting mass to a temperature above the boiling point of the liquid and above the softening point but not more than about a few degrees above the softening point of the resulting polystyrene, by immersing said mass in hot water, the relative proportions of monostyrene and said liquid employed being such that the polymerization product is a solid body containing the liquid dispersed throughout.

7. A process as claimed in claim 6, wherein the said heating is carried out while employing an external pressure of more than one atmosphere.

8. A process as claimed in claim 6, wherein the said heating is carried out in closed moulds under such conditions that expansion is possible substantially only in one direction.

9. A process as claimed in claim 12, wherein the said heating is carried out in a moist atmosphere.

10. Porous polystyrene characterized by a specific gravity of 0.2 to 0.005 and a multitude of fine pores, and obtained by the process of claim 1.

11. Porous polystyrene characterized by a specific gravity of 0.2 to 0.005 and a multitude of fine pores, and obtained by the process of claim 6.

12. A process for the production of porous polystyrene which comprises homogeneously dispersing in monostyrene a non-reactive volatile organic liquid in which polystyrene is insoluble, polymerizing this mixture at temperatures below the boiling point of the liquid under the conditions employed, and heating the resulting mass to a temperature above the boiling point of the liquid and above the softening point but not more than about a few degrees above the softening point of the resulting polystyrene by contacting said mass with hot water, the relative proportions of monostyrene and said liquid employed being such that the polymerization product is a solid body containing the liquid dispersed throughout.

References Cited in the file of this patent

UNITED STATES PATENTS

| Number | Name | Date |
|---|---|---|
| 2,075,429 | Douglas | Mar. 30, 1937 |
| 2,160,054 | Baur et al. | May 30, 1939 |
| 2,218,385 | Schulze | Oct. 15, 1940 |
| 2,268,160 | Miles | Dec. 30, 1941 |
| 2,386,995 | Wigal | Oct. 16, 1945 |
| 2,395,086 | Van Gilder et al. | Feb. 19, 1946 |
| 2,442,940 | Staudinger et al. | June 8, 1948 |
| 2,447,055 | Cooper | Aug. 17, 1948 |
| 2,525,966 | Smith et al. | Oct. 17, 1950 |
| 2,572,931 | Helle | Oct. 30, 1951 |
| 2,576,911 | Amos | Dec. 4, 1951 |